Feb. 28, 1961    J. E. CLEMENS    2,972,924
OPTICAL COMPARATOR AND RANGE FINDER
Filed Feb. 26, 1958    2 Sheets-Sheet 1
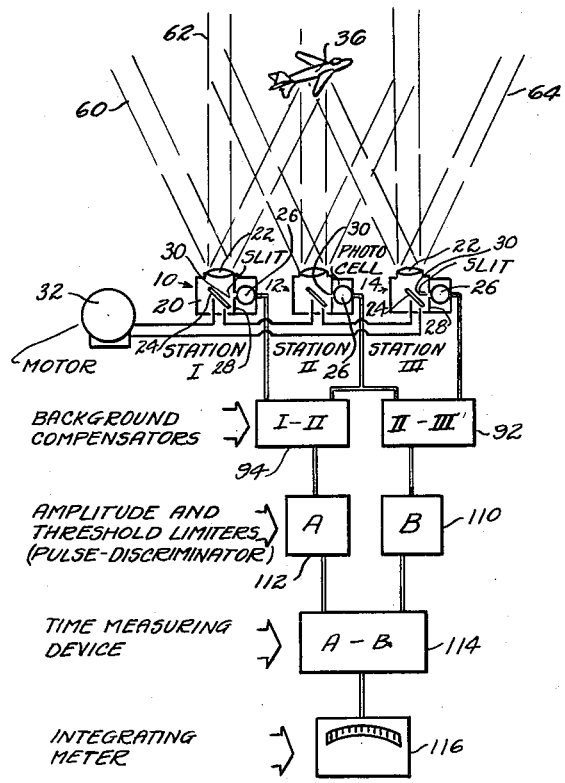
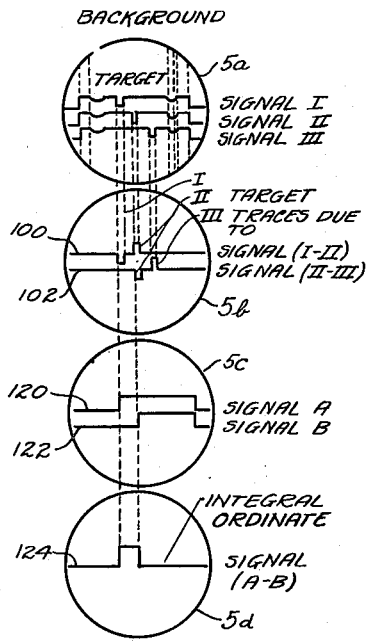
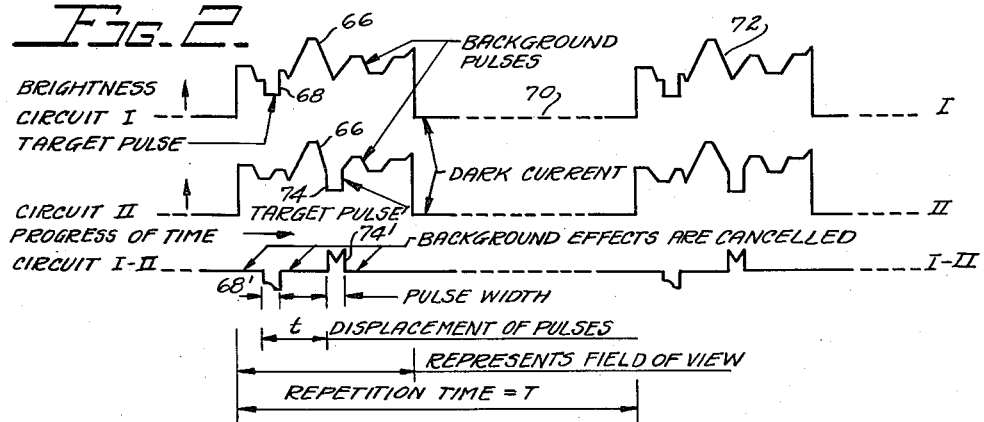
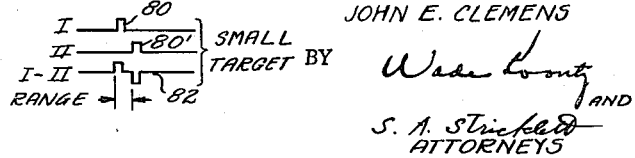
INVENTOR.
JOHN E. CLEMENS
BY
ATTORNEYS

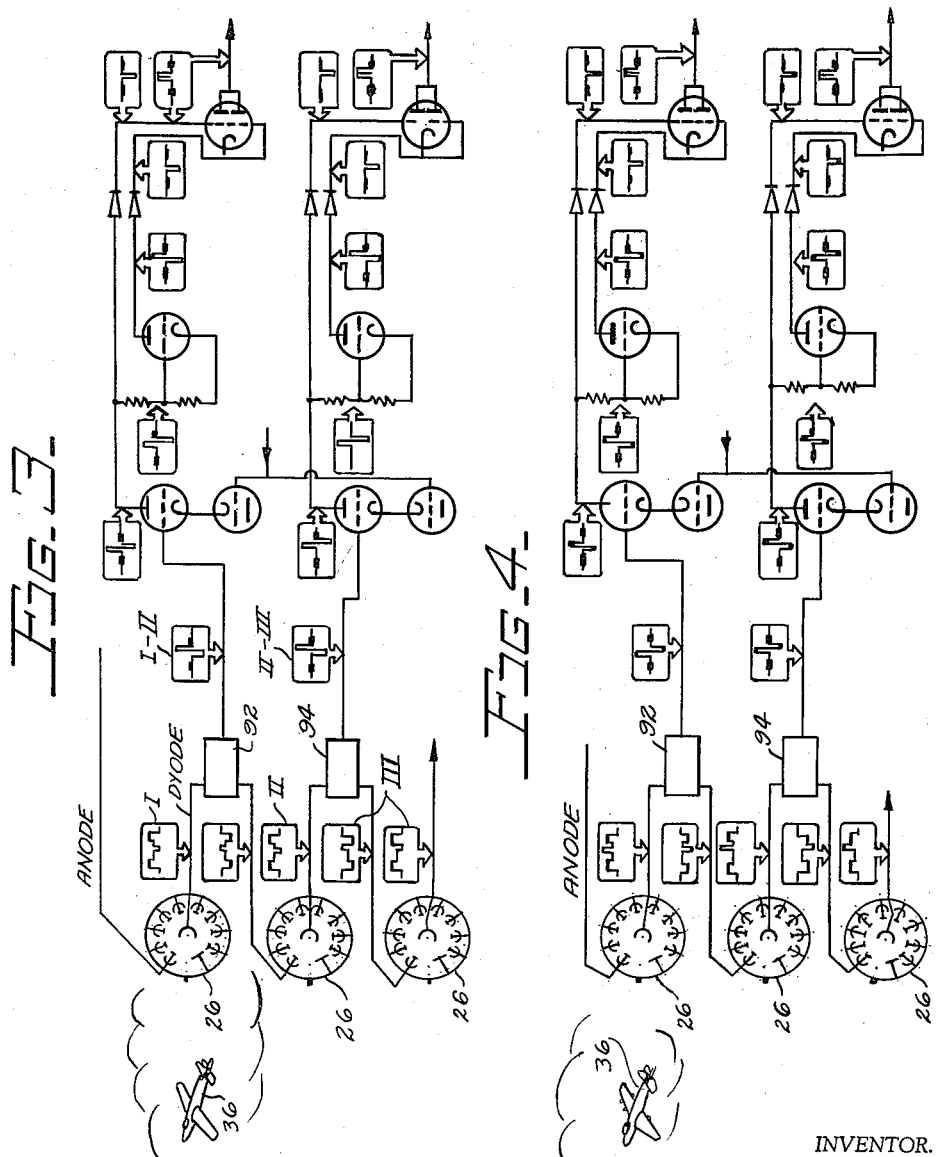

United States Patent Office 2,972,924
Patented Feb. 28, 1961

2,972,924
OPTICAL COMPARATOR AND RANGE FINDER
John E. Clemens, Xenia, Ohio, assignor to the United States of America as represented by the Secretary of the Air Force
Filed Feb. 26, 1958, Ser. No. 717,791
2 Claims. (Cl. 88—1)
(Granted under Title 35, U.S. Code (1952), sec. 266)

The invention described herein may be manufactured and used by or for the United States Government for governmental purposes without payment to me of any royalty thereon.

This invention relates to an optical comparator and particularly to a high speed optical comparator providing an automatic optical range finder.

In warfare it is frequently necessary to determine the range of objects at undetermined distances from the range finding station. Several types of discovery apparatus such as radar and the like are utilized for this purpose, however, these devices emanate electrical pulses which may be intercepted by the enemy so that the range finding station may be located and thus subjected to attack. The present invention utilizes an optical comparator which provides a passive range finding device so that it may not be located by the enemy because of any radiation which it emits.

An optical comparator in its principle may be described as a means to compare two light levels or two images of arbitrary average brightness. In particular, the term comparator is linked with the identity of a zero method where either the brightness of one of the light sources or its relative distance from the point of observation is controlled in such a manner that the difference effect equals zero (photometer) or as it is similarly done in the electrical device of a Wheatstone bridge. In order to make the optical comparator work automatically, one can introduce photocells as sensitive detectors provided they are calibrated electronically or equalized in any way so that high speed indication can be achieved.

In cases where nearly identical views are to be compared which differ only in tiny spots, which are localized, one is obliged to scan both views simultaneously and synchronously either spotwise, as in television, or sectionally as by a focal plane shutter. The present invention utilizes an optical comparator combined with photocell detectors and focal plane scanning to provide an improved comparator which may successfully be utilized as an automatic range finder.

In the range finder according to the invention a plurality of viewing devices are arranged to provide parallel binocular devices having a common mid-leg so that the device becomes a three-eyed viewer. Each viewer is provided with an objective lens with the lenses of each of the viewers viewing parallel beams from a distant background. A photosensitive device is mounted adjacent to each viewer and a scanning device is utilized to simultaneously scan the background and any object or target which may be between the viewers and the distant background. The viewers will each provide a substantially simultaneous view of the distant background but because of the parallel effect the viewers will successively view any object between the viewers and the background. This results in an electrical output from the detectors having a contour or value corresponding to the light intensity of the background plus or minus the light intensity of any object between the viewers and the background. Because of the successive viewing of the object the outputs from the various detectors will contain disturbances caused by the object being viewed. By subtracting the output of one viewer from the output of an adjacent viewer the values corresponding to the background are eliminated so that only the disturbances resulting from the object will be retained in the output signal. The spacing between these disturbances may be readily measured by various devices to determine in relation to the distance between the viewers the distance to the target or object.

It is accordingly an object of the invention to provide an improved optical comparator.

It is a further object of the invention to provide a passive range finder.

It is still another object of the invention to provide an optical comparator automatically providing range information.

Other objects and advantages of the invention will be apparent from the following detailed description taken in combination with the accompanying drawings in which:

Fig. 1 is a schematic illustration of an optical comparator according to the invention;

Fig. 2 is a diagrammatic illustration showing typical output pulses and the method of compensating to remove background clutter;

Figs. 3 and 4 show an electrical system for utilizing the output characteristic of the viewers to determine range distance, Fig. 3 showing the type of impulse when the object is darker than the background and Fig. 4 showing the impulse type when the object is lighter than the background;

Fig. 5 shows a step by step comparison of the signals from a comparator to provide the time interval and consequently the range distance of the object viewed;

Fig. 6 shows the type of impulse secured when a small target is viewed; and

Fig. 7 discloses the type of impulse when a larger object is viewed.

In the construction according to the invention three substantially identical viewers 10, 12 and 14 are mounted as a unit with a substantially identical base distance between each viewer and the next adjacent viewer. Each viewer comprises a housing 20 in which is mounted an objective lens 22 which focuses the image viewed on a double sided rotating mirror 24. A light sensitive electronic device 26 is mounted in the housing 20 and is shielded from the mirror 24 by an opaque shield 28 having an elongated focal plane slot 30 therein. The electronic device 26 is preferably a multistage photoelectric cell. However, for certain types of observation heat sensitive devices may be utilized so that a lower range of the spectrum may be utilized, particularly for night observation. The mirrors 24 are mounted for synchronous rotation by means of a suitable motor 32, preferably the mirrors were mounted on a common shaft so that exact synchronism may be maintained.

The lens 22 when utilized for visible light will of course be constructed of any desirable glass, however, when the lower range of the spectrum such as the infrared is utilized the lens 22 will preferably be constructed of crystals preferably of the thallium hallide group. Among the crystals which have been found useful for this purpose are artificially grown crystals of potassium iodide, potassium bromide and common rock salt, however, apparently the most sensitive crystal is thallium bromide. In the utilization of the viewers all of the mirrors 24 are exactly parallel and the objective lenses 22 view a substantially identical background at a distance. In the initial scanning positions or position 60 one of the objectives 22 such as the objective 22 of viewer 14 will view the distant background and the object 36 while the viewers 12 and 10 will view only the distant background. At a later time such as position 62 the objective of viewer 12 will view the background and the object 36 and the objectives of viewers 10 and 14 will view only the background. At a final position or 64 the objective of viewer 10 will view the background and the target 36 while the objectives of viewers 12 and 14 will see only the background. As the light from the objective is scanned across the slits the electronic detectors will produce an output as indicated in Fig. 2. The background will cause a clutter depending on the intensity of the illumination and the target will produce a distinctive pulse having width depending upon the size of the target and the distance from the viewer. As indicated in Fig. 2 the output from the first viewer such as the viewer 14 will show the entire scan followed by a dark interval 70 of substantially constant current and then a reoccurring scan as the back of the double mirror 24 again scans the view across the slit. The second viewer such as viewer 12 will produce substantially an identical clutter scan 66 but the target impulse 74 will occur at a later time. By subtracting the scanning product of the two viewers which may be done by taking the negative output of one viewer and comparing it with the positive output of the adjacent viewer as shown in Figs. 3 and 4 the clutter 66 will substantially cancel out leaving only the impulses 68' and 74' resulting from the discontinuity produced by the target 36. Where $t$ is the displacement of the pulses and T is the repetition time, it is obvious that the quotient $$\frac{T}{t}$$

is proportional to the distance to the target object 36. When the target 36 is relatively small the impulses 80 will be relatively narrow as shown in Fig. 6. When the impulses 80—80' of the two adjacent viewers are subtracted from each other it will result in a composite signal as shown at 82 in Fig. 6 and the distance between the beginning of the first and second impulses 80—80' of the composite signal 82 indicates the range. However, when the target is relatively large the signal impulses will overlap as shown in Fig. 7 resulting in a duplicate pulse composite signal as shown at 90. However, the distance between the beginning of the two pulses indicates the range as indicated in Fig. 7.

One has to expect to be confronted with small targets as well as large ones. Furthermore, it can happen that the brightness of the target is lower or even higher than that of the background. How such a reverse contrast would show up is indicated in the output voltage indicated in Figs. 3 and 4. This means that the polarity does not indicate which one is the first pulse or the second pulse. The evaluating circuit has to be made sensitive to both polarities. In the case of a large target, the two pulses overlap as shown in Fig. 7. The distance between the beginning of the pulses produced by the large target appears substantially as the distance between pulses produced by the small target. While the difference curve looks particularly like the former one the interpretation is quite different. As is indicated in Figs. 6 and 7 this is corrected by utilizing a pair of binocular devices with each half accomplishing full compensation of the background and furnishing one measuring pulse each as shown in Fig. 5. The pulses provided by the two edges of the three-eyed binocular system may be readily utilized to provide a pulse width proportional to the range.

In the operation of the construction the motor 32 will be operated to rotate the double sided mirrors 24 in complete synchronism so that clutter resulting from the background will be substantially simultaneous in the output of each of the viewers and the target impulse will be successively received as shown in the signals I, II and III of Fig. 5a and when the output from two successive signals such as the signals from viewers 12 and 14 are subtracted by the compensator they will provide a composite signal trace (I—II) as shown at 100 in Fig. 5b. Likewise the subtraction of the signals II and III as from viewers 10 and 12 by the compensator 94 will produce a second composite signal 102. The first composite signal 100 from the first and second signal from viewers 12 and 14 will trigger the pulse producing device 110 to provide a first signal 120 as shown at Fig. 5c and the second composite signal will trigger the pulse device 112 to provide a second signal 122. A time measuring device receives the signals 120 and 122 to provide an integral ordinate signal 124 proportional to the distance to the target. This proportional distance may be used to actuate an integrated meter 116 to visually indicate the range to the target. Obviously, the integrated meter 116 could be dispensed with and the distance calculated from the integral signal 124.

For purposes of illustration a preferred embodiment of the invention has been shown and described according to the best present understanding thereof. However, it will be apparent to those skilled in the art that various changes and modifications may be readily resorted to without departing from the true spirit and scope of the invention.

What is claimed is:

1. A comparator for obtaining by passive means the range of an object distinguishable from its background by reason of its radiation contrast therewith comprising three spaced apart radiation receiving stations, each of said stations including a window viewing substantially the same background, a mirror behind each of said windows, substantially matched electron tubes providing electric energy output proportional to the radiation falling on said tubes, a radiation shield about each of said tubes, each of said shields having an aperture between said tube and the axis of the respective mirrors, drive means connected to synchronously move said mirrors to scan said background and said object across said aperture to produce a signal in each tube proportional to the intensity of the radiation passing through said aperture, a first comparison circuit receiving the output signals of the first and second tube means to provide a first composite signal, a second comparison circuit comparing the output signals of said second and third tubes to provide a second composite signal, said composite signals containing substantially only object information and time measuring means responsive to said first and second composite signals.

2. A passive range finder for finding the range of an object distinguishable from the background by virtue of its contrast therewith comprising a plurality of spaced apart observation stations, said stations being positioned to receive substantially parallel radiation beams from said background, each of said stations including a lens, a mirror positioned to receive the image produced by said lens, a shield about said mirror, said shield having a slot, a photocell responsive to the radiation passing through the slot, driving means connected for synchronously rotating said mirrors for simultaneously scanning the view of each of said stations across the respective slot to produce in each of said photocells a signal proportional to the intensity of radiation passing through the respective slots, a first comparison circuit connected to receive the output signals of the first and second photocells to provide a first composite signal, a second comparison circuit connected to receive the output signals of the second and third photocells to provide a second composite signal, said composite signals containing substantially only object information and time measuring means responsive to said first and second composite signals.

References Cited in the file of this patent
UNITED STATES PATENTS

| 2,384,552 | Kaprelian | Sept. 11, 1945 |
| 2,444,235 | Walker | June 29, 1948 |
| 2,606,245 | Hall | Aug. 5, 1952 |
| 2,786,096 | Palmer | Mar. 19, 1957 |

FOREIGN PATENTS

| 352,035 | Great Britain | June 22, 1931 |